(12) United States Patent
Bonen

(10) Patent No.: US 11,271,650 B1
(45) Date of Patent: Mar. 8, 2022

(54) AERONAUTICAL BAND LEAKAGE ASSESSMENT IN HIGH SPLIT HFC PLANT

(71) Applicant: Harmonic, Inc., San Jose, CA (US)

(72) Inventor: Adi Bonen, Belle Mead, NJ (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 16/995,541

(22) Filed: Aug. 17, 2020

Related U.S. Application Data

(63) Continuation-in-part of application No. 16/657,909, filed on Oct. 18, 2019.

(60) Provisional application No. 62/893,625, filed on Aug. 29, 2019.

(51) Int. Cl.
| | |
|---|---|
| *H04N 7/173* | (2011.01) |
| *H04B 10/2575* | (2013.01) |
| *H04N 21/61* | (2011.01) |
| *H04B 17/00* | (2015.01) |

(52) U.S. Cl.
CPC ..... *H04B 10/2575* (2013.01); *H04B 17/0085* (2013.01); *H04N 21/61* (2013.01)

(58) Field of Classification Search
CPC . H04B 10/2575; H04B 17/0085; H04N 21/61
See application file for complete search history.

(56) References Cited

U.S. PATENT DOCUMENTS

| | | | |
|---|---|---|---|
| 9,832,089 B2 * | 11/2017 | Zinevich | H04N 17/004 |
| 2015/0181442 A1 * | 6/2015 | Zinevich | H04B 17/318 |
| | | | 455/424 |
| 2015/0318937 A1 * | 11/2015 | Ruth | H04B 3/32 |
| | | | 375/224 |
| 2017/0141845 A1 * | 5/2017 | Totten | H04B 10/0771 |
| 2018/0159590 A1 * | 6/2018 | Williams | G01S 5/02 |
| 2019/0107572 A1 * | 4/2019 | Williams | H04B 3/462 |

* cited by examiner

*Primary Examiner* — Mulugeta Mengesha
(74) *Attorney, Agent, or Firm* — Brokaw Patent Law PC; Christopher J. Brokaw

(57) ABSTRACT

Propagating a leakage test signal at a frequency receivable by traditional leakage test systems while supporting enhanced upstream peak data rates. At an input of an amplifier of a device, a portion of the leakage test signal is tapped to create a tapped signal, which comprises both the leakage test signal and all other downstream signals and channels sent from a head-end to a set of customer premises equipment (CPE) via the device. The tapped signal is introduced to a filter that passes the leakage test signal and attenuates all other radio frequency (RF) signals to create a filtered leakage test signal. The filtered leakage test signal is amplified and coupled to a low-pass side of a high-split diplex filter to propagate onto a transmission medium coupled to the HFC plant receivable by a traditional leakage test system. The device may be a high-split RF amplifier or a high-split node.

15 Claims, 13 Drawing Sheets

AERONAUTICAL BAND LEAKAGE ASSESSMENT IN HIGH SPLIT HFC PLANT

CLAIM OF PRIORITY

This application claims priority to U.S. Provisional Patent Application Ser. No. 62/893,825, filed Aug. 29, 2019, entitled "Aeronautical Band Leakage Test in High Split HFC Plant," the contents of which are hereby incorporated by reference in their entirety for all purposes as if fully set forth herein.

FIELD OF THE INVENTION

Embodiments of the invention generally relate to the performance of an aeronautical band leakage assessment, and more specifically to the propagation of a leakage test signal in a high-split node or amplifier in a frequency inside the upstream portion of the spectrum.

BACKGROUND

Hybrid Fiber Coax (HFC) is a term that refers to a broadband network based on a combination of optical fiber and coaxial cable. An HFC architecture is often used by cable TV (CATV) operators. In modern cable TV networks, optical fiber is used to transport data between a headend and an optical node deployed in a neighborhood or area of service, while coaxial cable is used to transport data between the optical node and the local houses and locations in the area of service of that optical node.

Over the years, the CATV HFC architecture has evolved such that optical nodes are deployed increasingly closer to cable customers' premises. Older HFC systems deployed long chains of amplifiers (sometimes, but not always, arranged in a tree structure) between the optical node and cable customers' homes. Over time, amplifier chains have become shorter by converting a single long chain of amplifiers connected to a single optical node into multiple, smaller chains of amplifiers connected to multiple optical nodes, such that the same area of service previously supported by a single optical node is now serviced by a plurality of optical nodes.

The size of the service domains of an optical node are often quantified not by the length and reach of the coaxial cables, but rather by the number of cascaded amplifiers used in the path of the coaxial cable running between the optical node and the cable customer's premises. For example, an N+6 deployment signifies that there are as many as 6 amplifiers cascaded between the optical node (N) and at least one or more customers.

In a Radio Frequency (RF) amplifier chain, each RF amplifier typically receives a low-level downstream RF signal from the end of a coaxial cable segment connected to its downstream (DS) input port, amplifies the RF signal, and outputs the amplified RF signal onto the next coaxial cable segment. The RF amplifier also receives a low-level upstream RF signal from the end of a coaxial cable segment connected to its upstream input port (which is also the downstream output port), amplifies that RF signal, and outputs that amplified RF signal onto the next coaxial cable segment at the upstream output port (which is also the downstream input port). Thus, a RF amplifier handles counter propagating downstream and upstream signals.

The RF amplifier always has one downstream input port but may have two or more downstream output ports. Accordingly, the RF amplifier may need to internally split the downstream signal onto multiple output ports, and internally combine the upstream signals received from multiple upstream input ports.

Recently, a major evolutionary step has become popular, often termed fiber-deep deployment, where a fiber optic cable (or simply "fiber") is extended from a cable operator's headend or hub deep into the CATV outside plant, close to the customers' premises, into a node that produces RF signals for final distribution over the coaxial network. Fiber-deep deployment avoids the need to pass the RF signals through HFC plant RF amplifiers. Another term used for this architecture is N+0, where N stands for the node and zero signifies that there are no (zero) standalone RF amplifiers between the node and the customers' premises. Most such high output fiber-deep (FD) nodes comprise 4 RF output ports, each driven by a dedicated high output internal power amplifier.

In another dimension of CATV plant evolution, the HFC network available spectrum has been increased over the years. While early HFC plants were limited to about 300 MHz of usable spectrum, most current HFC plants have been upgraded multiple times, and currently operate in the range of 5 MHz to 750 MHz. Some more advanced HFC plants have been upgraded further, and while maintaining the same lower 5 MHz limit, they support an upper limit of 870 MHz, 1002 MHz, and perhaps even 1218 MHz.

The HFC plants are designed such that downstream and upstream transmissions utilize a different portion of the overall available spectrum. Upstream transmissions (i.e., in the direction from homes to the cable headend) use the lower part of the spectrum, and downstream transmissions (i.e., in the direction from the cable headend to homes) use the upper part of the spectrum. HFC plants are typically designed with a specific small guard band between the upstream and downstream signals. A typical guard band width is between 20% and 30% of the highest frequency useable by upstream signals.

Diplex filters are commonly used in optical nodes, HFC plant RF amplifiers, home amplifiers, and consumer premises equipment (such as cable modems, set top boxes, and the like) to facilitate combining downstream and upstream signals onto a single coaxial cable. Diplex filters are typically composed of a low-pass filter to pass the upstream signals but block the downstream signals, and a high-pass filter to pass the downstream signals but block the upstream signals.

Both low-pass and high-pass filters possess a pass band, a stop band, and a transition band between them. Diplex filters are typically designed to apply a low loss in their pass band, and a certain minimal required deliberate loss in their stop band. The complexity and cost of a diplex filter is inversely associated with the filter's guard band ratio "aggressiveness," namely, the ratio between the guard band frequency width and the highest frequency useable by upstream signals. For example, a 42/54 MHz diplex filter (typically called a low-split diplex filter) has a 28.6% guard band ratio, which is considered non-aggressive. On the other hand, an 85/102 MHz diplex filter has a 20% guard band ratio, which is considered aggressive.

Almost all the present North American HFC plant deployments use low-split 42/54 MHz diplex filters, meaning that the low portion of the spectrum up to 42 MHz is used for upstream transmissions, while the high portion of the spectrum starting from 54 MHz is used for downstream transmissions. FIG. 1A is an illustration of a typical North American 750 MHz low-split HFC plant spectrum allocation with a 42/54 MHz diplex filter, the downstream Out-of-Band (DS-OOB) signal centered at 75.25 MHz, the upstream Out-of-Band (US-OOB) signal, four DOCSIS 3.0 upstream channels, and 115 downstream 256 QAM channels in accordance with the prior art. To provide a better appreciation of the lower frequency region of the spectrum, FIG. 1B is an illustration of an enhanced view of the lower frequency region of the spectrum depicted by FIG. 1A in accordance with the prior art.

The lower part of the upstream spectrum is prone to greater interference and noise. This is so because the lower the frequency, the more interference is present. This phenomenon is shown in FIG. 1B; note how the vertical lines representing noise and interference are drawn taller, signifying a greater presence, in the lower frequencies. As a result, only about the top 25 MHz of the upstream spectrum is typically used for upstream cable modem data transmissions. This amount of usable upstream spectrum supports a typical total upstream data transmission capacity of about 100 Mbps, which is shared by all the cable modems for which their upstream signals are combined into a single CMTS (Cable Modem Termination System) receiver.

Typical European HFC plant deployments use a slightly higher frequency split of 65/85 MHz. The slightly higher upstream/downstream split of a typical European HFC plant deployment allows for an upstream data transmissions capacity that is about double that of the typical North American deployment.

In recent years, due to the need to enable higher data throughputs in upstream transmissions from customers' cable modems, some North American HFC plant deployments have been upgraded to employ 85/102 MHz diplex filters (typically called mid-split diplex filters). This increase in the amount of usable upstream spectrum, which is less prone to interference and noise, typically enables up to a five-fold increase in upstream data capacity. Cable modems and CMTS, which were designed to support the DOCSIS 3.1 specifications and installed in an HFC plant designed with 204/258 MHz diplex filters (typically called high-split diplex filters), may support even a higher upstream data capacity. The total upstream data capacity in such a high-split HFC plant deployment can typically approach 1.7 Gbps.

Recall that the upstream data capacities discussed above are shared domain capacities, as the total upstream transmissions from all cable modems received by a single CMTS receiver cannot surpass the upper limit of the amount of upstream data supported by the CMTS. The group of cable modems which are served by or communicate with a single CMTS receiver are collectively called an upstream service group. Similarly, the group of cable modems that receive the downstream transmission of a certain CMTS transmitter are collectively known as a downstream service group. In a typical cable deployment, a downstream service group is composed of one or more (typically not more than 4) upstream service groups.

The peak upstream or downstream data transmission of any one cable modem is typically limited by the cable operator to a portion of the total transmission capacity enabled by the HFC plant in either the upstream or the downstream direction. Placing such limits on each cable modem is done to assure that a single customer will not use more than their allocated share of the complete available capacity of the service group. Cable operators typically advertise and offer to their customers several different tiers of service that support different downstream and/or upstream peak data rates. The highest data rate in either direction must account for the total data capacity in each direction respectively, the number of customers sharing the service group, and the usage statistics of those customers. To illustrate by example, in small service groups (e.g., 30 to 60 subscribers), a peak rate of up to ⅔ of the capacity may be enabled. In medium size service groups (e.g., up to 300 subscribers), a peak rate of up to ½ of the capacity may be enabled. In large size service groups (e.g., 500 subscribers and more), a peak rate of up to ⅓ or lower of the capacity may be enabled. However, in new deployments with much larger upstream data rate capacity (such as in a high-split plant), a new pattern has emerged, where the peak upstream rate enabled to a single modem can be a higher portion (up to 90% to 95%) of the service group capacity even in large service groups.

An HFC plant evolution in the form of node segmentation has had a large effect on the total capacity of the HFC plant, but the effect on the peak data rate is smaller. For example, a 10-way segmentation converting a mid-size service group of 300 subscribers to 10 small service groups of 30 subscribers each will increase the total data capacity by a factor of 10. However, the peak rate achievable by a single subscriber is typically increased by only 33%.

For quite a few years, cable operators have been using node segmentation to increase both data capacity and data peak rate. In the downstream direction, node segmentation was employed to increase the total downstream spectrum available to DOCSIS data transmission, either by increasing the total available downstream spectrum or by reallocating a larger portion of the available downstream spectrum to data transmissions at the expense of less spectrum allocated to dedicated video transmissions. Consequently, over the years, growth of both downstream data capacity and downstream data peak rates has been consistently achieved.

However, while total upstream data capacity has grown substantially over the years due to node splits, the achievable upstream peak data rate has not grown by much, and a severe limit has been reached. A typical high tier service offering may include a 1 Gbps downstream rate, but only a 30 Mbps maximum upstream rate. This issue has recently caused some cable operators to initiate an HFC plant split upgrade. This type of upgrade is much costlier than node segmentation since it must be applied to the complete HFC plant all at once and cannot be implemented in a piecemeal fashion to just a particular set of service groups which require more data capacity.

Meanwhile, the United States Federal Communications Commission (FCC) requires cable providers to satisfy certain obligations designed to prevent interference between their cable distribution systems and communications exchanged in aeronautical bands. The term 'aeronautical bands' refers to a portion or portions of the radio frequency (RF) spectrum that has been set aside for communications involving aeronautical vehicles. For example, an airplane uses a certain frequency in the aeronautical bands to communicate with an airport control tower. The FCC requires that cable system operators restrict the maximum power of any signal transmitted in their cable distribution system in certain frequencies in or near the aeronautical bands, specifically near the 108-137 MHz VHF aeronautical band. The FCC further requires that cable operators perform leakage tests to verify and demonstrate that the RF signal power leakage from coaxial cables in the cable plant will not interfere with communications exchanged in the aeronautical bands. For this reason, leakage tests must be performed by cable operators in or near the 108-137 MHz VHF aeronautical band.

For decades, cable operators have satisfied FCC requirements by performing a leakage test that uses a leakage test signal included in the downstream channel lineup at or near the VHF aeronautical band. FIG. 2A is an illustration of the aeronautical band and a leakage test signal as might be including in a downstream channel lineup in accordance with the prior art. FIG. 2A depicts a typical North American 750 MHz low-split HFC plant spectrum with 42/54 MHz diplex filters, four DOCSIS 3.0 upstream channels, 115 downstream 256QAM channels, and with a leakage test signal between two downstream QAM channels near the edge of the VHF aeronautical band. FIG. 2B is a close-up view of the lower frequency region of the spectrum shown in FIG. 2A. Note that in FIG. 2B, the leakage test signal is situated between two downstream QAM channels near the edge of the VHF aeronautical band.

To perform the leakage test, a cable operator uses a specialized wireless leakage detection device to receive the leakage test signal. The specialized wireless leakage detection device can detect the existence and location of leakage sources in the HFC plant. This manner of leakage test system enables cable operators to identify any RF leakage in the coax plant that may interfere with the VHF aeronautical band and conform to the relevant FCC requirements. Modern leakage test systems utilize a dedicated extremely narrow signal, which may be placed between two existing downstream channels, at a much lower power than a normal downstream channel, thereby allowing for continuous leakage testing without "wasting" any of the downstream spectrum.

FIG. 3A depicts the downstream propagation of a leakage test signal as used in certain leakage test system known in the prior art. FIG. 3A illustrates an HFC cable plant with an R-PHY node, an RF plant amplifier, and cable taps to provide the cable signals to customers' homes. The leakage in aeronautical band in an HFC cable plant propagating the downstream leakage test signal may be detected by a wireless leakage detection device as shown.

The conversion of an HFC plant to high-split removes the 108-137 MHz VHF aeronautical band from the portion of the spectrum used for downstream transmission and places the aeronautical band inside the portion of the spectrum used for upstream transmission. As a result, while no downstream signal in an HFC plant is expected to interfere with the VHF aeronautical band, plant leakage still must be tested to demonstrate to the FCC that no upstream transmission in the HFC plant is causing an interference in the VHF aeronautical band. However, traditional leakage test systems that rely on a leakage test signal transmitted downstream in or near the VHF aeronautical band cannot be employed since the leakage test signal cannot propagate through the various high-split diplex filters employed in the HFC plant. Thus, an alternative method is required in a high-split HFC plant to test RF leakage in or near the VHF aeronautical band.

A typical upgraded North American 1218 MHz high-split HFC plant spectrum as known in the prior art is depicted in FIG. 4. FIG. 4 depicts the VHF aeronautical band overlapping part of an upstream OFDMA channel as known in the prior art. FIG. 4 illustrates a high-split HFC plant spectrum with 204/246 MHz diplex filters, four DOCSIS 3.0 upstream channels, two DOCSIS 3.1 OFDMA upstream channels, 66 256QAM downstream channels, three DOCSIS 3.1 OFDM downstream channels, and with the VHF aeronautical band overlapping part of OFDMA channel 2.

Several methods have been proposed to satisfy the FCC requirements designed to ensure no interference exists between the HFC plant transmissions and the VHF aeronautical band when the HFC plant utilizes high-split diplex filters. One approach is simply to not use the frequency range covered by the VHF aeronautical band for either downstream or upstream transmissions. While not using this frequency range may alleviate the need to implement leakage tests, it is wasteful in terms of spectrum utilization. The 29 MHz that would need to be avoided represent 18% of the amount of spectrum regained when converting the HFC plant from low-split to high-split. Accordingly, this approach is highly undesirable.

Another proposed approach involves a new type of leakage detection system that is capable of detecting RF leakage of some specific upstream transmissions from high-split enabled cable modems. These modems will periodically be commanded to transmit certain specific upstream transmissions by a Cable Modem Termination system (CMTS), which the new type of leakage detection system will evaluate for leakage. Such a scheme has several drawbacks, including requiring a completely new leakage detection system, a standardization of this new approach, utilization of some of the available upstream data capacity for leakage detection, and enabling leakage detection only during the specific times when the specific upstream transmissions are utilized. In addition, such a scheme can only detect leakage in coaxial cable between each transmitted cable modem and the CMTS. This proposed approach may not even satisfy the FCC requirement which demands coverage of at least 75% of the coax plant, as well as any coaxial cable known or suspected to have lower performance than the coax plant average.

Another previously proposed approach relies on the generation and downstream transmission of a simple leakage detection signal in every HFC-plant device in-between the optical or R-PHY node and the customers' homes that employs diplex filters. While the diplex filter in each such device will block the propagation of the leakage signal transmitted in the downstream direction towards it, the device will ensure that a new signal is added to every downstream output port. This approach allows for using existing leakage detection systems while testing leakage in all the coaxial cable in the plant. Nevertheless, the generation of a leakage detection signal in every device is almost certainly prohibitively complicated and expensive, thereby rendering this an undesirable option.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1A:
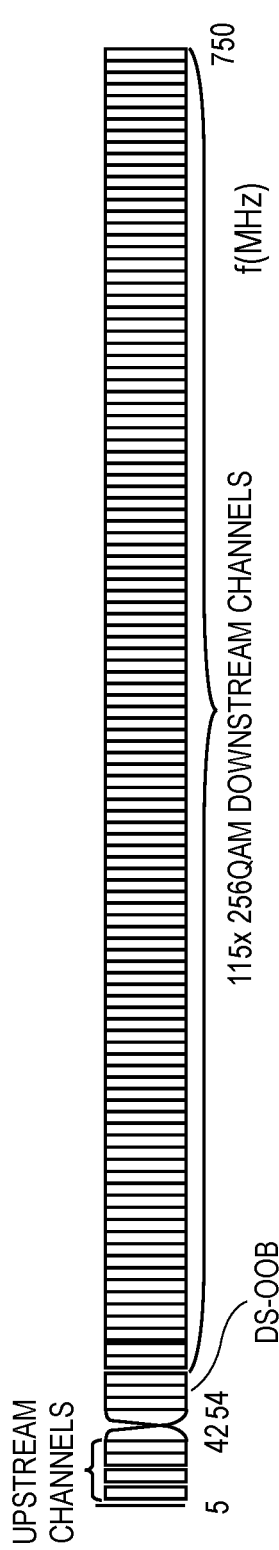
FIG. 1A is an illustration of a typical North American 750 MHz low-split HFC plant spectrum employed by a 42/54 MHz diplex filters, a DS-OOB signal centered at 75.25 MHz, a US-OOB signal centered at 15 MHz, four DOCSIS 3.0 upstream channels, and 115 downstream 256QAM channels in accordance with the prior art.
Figure 1B:
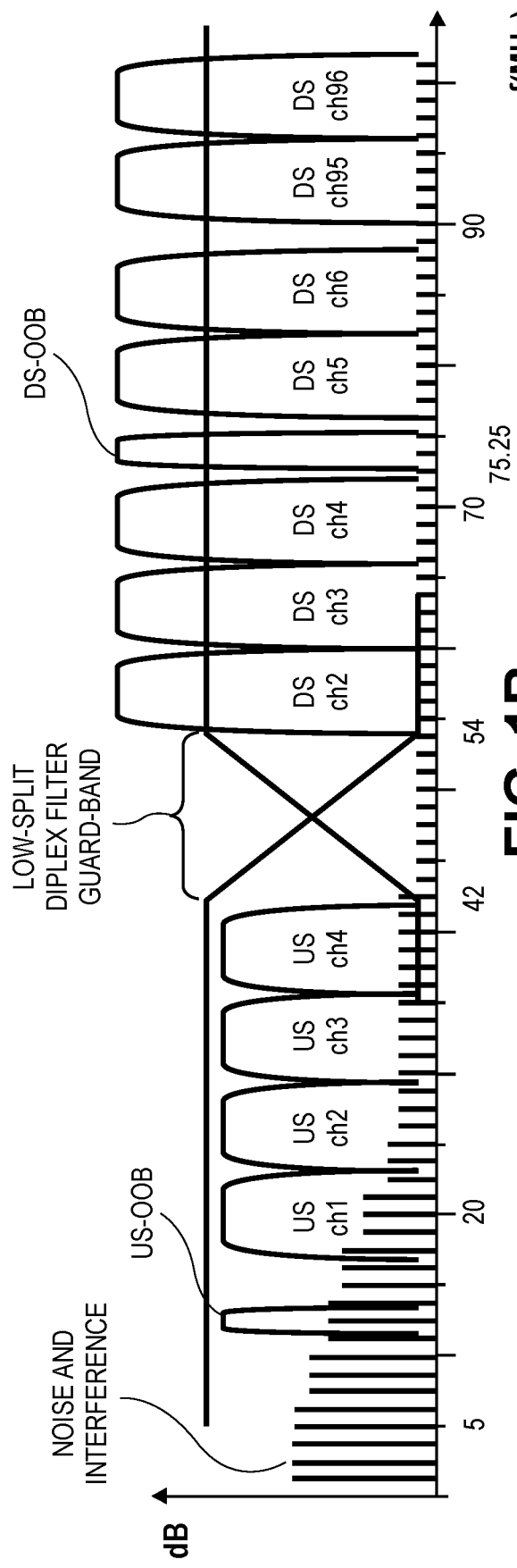
FIG. 1B is an illustration of an enhanced view off the lower frequency region of the spectrum depicted by FIG. 1A in accordance with the prior art.
Figure 2A:
FIG. 2A is an illustration of the aeronautical band and a leakage test signal as might be including in a downstream channel lineup in accordance with the prior art.
Figure 2B:
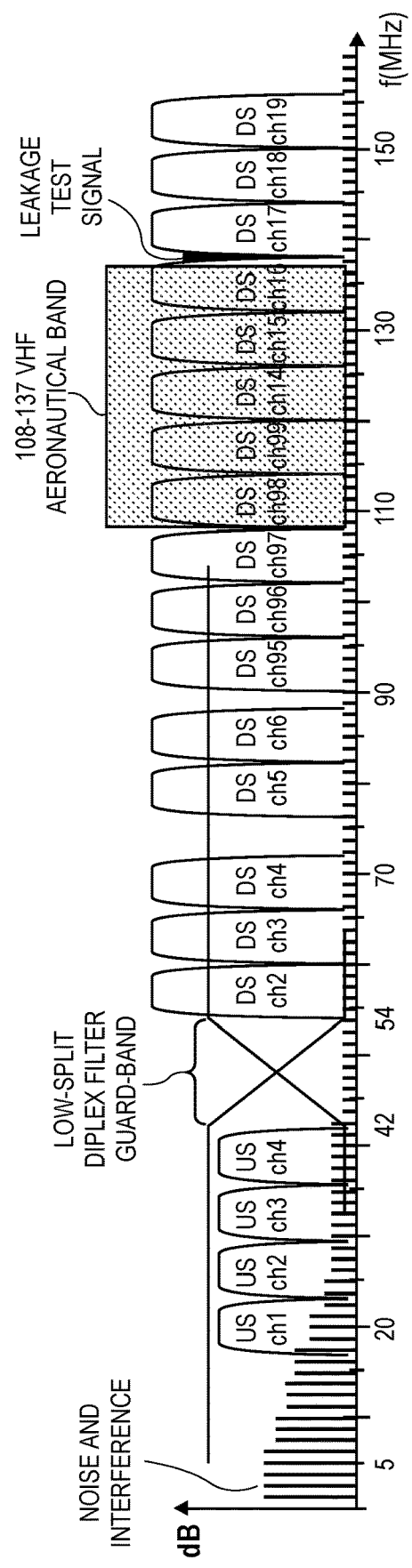
FIG. 2B is an illustration of an enhanced view off the lower frequency region of the spectrum depicted by FIG. 2A in accordance with the prior art.

Approaches are described herein for an aeronautical band leakage assessment in a high-split cable plant with legacy receivers in according to an embodiment of the invention. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Overview

Most of the North American HFC cable plants are limited to a low-split 5-42 MHz upstream spectrum, which typically caps a DOCSIS 3.0 enabled upstream service to a peak rate that is under 50 Mbps. This peak rate for upstream service is hardly enough for a cable operator considering competitive pressure from Passive Optical Networks (PON) and the looming threat of 5G. Cable plant segmentation does increase available upstream capacity; however, even segmenting to fiber deep N+0 hardly affects supportable upstream peak rates unless upstream spectrum is also upgraded.

To date, most of the North American upstream spectrum upgrades have involved a mid-split that supports a 5-85 MHz upstream spectrum. When accompanied by an aggressive cable modem deployment that supports the DOCSIS 3.1 ("D3.1") protocol, a mid-split spectrum upgrade enables upstream service peak rates in the 200~300 Mbps range. However, even this upstream service peak rate falls short of the goal of providing a PON-competitive 1 Gbps upstream service. Considering the factors that D3.1 cable modems supporting high-split (5-204 MHz upstream spectrum) have been available for quite some time, the cost of upgrading a HFC plant to support a mid-split spectrum is practically the same as upgrading to support a high-split spectrum, and employing a high-split spectrum can indeed enable an upstream gigabit service, it would be desirable for a HFC plant upgrade to support to a high-split spectrum rather than merely a mid-split spectrum.

Embodiments of the invention address and resolve the above problem by enabling the propagation of a leakage test signal in a high-split optical node (or Remote-PHY node) in a frequency inside the upstream portion of the spectrum. In an embodiment, an amplified narrowband window around the 108-137 MHz aeronautical band is coupled into the upstream port of the diplex filter and excluded from the regular upstream path. Example embodiments of the invention show how an optical node with high-split diplex filters can maintain a traditional leakage test signal at a frequency receivable by a traditional leakage test system. When an optical node or a Remote-PHY node implementing an embodiment of the invention is used in a fiber deep N+0 HFC plant, the leakage test signal can propagate all the way to customers' homes, thereby enabling leakage testing in all the coax in the HFC plant. At the same time, the use of high-split diplex filter in the node enables the cable operator to provide a gigabit speed upstream service to customers.

A different use case is enabled by embodiments of the invention involving the downstream propagation of a leakage test signal in high-split HFC plant RF amplifiers. The leakage test signal is tapped from the single downstream input port (which is also the upstream output port) of the RF amplifier after the signal passes through the low-pass port of the high-split diplexer. Then, an amplified narrowband window around the frequency of that signal is coupled into the upstream port of the diplex filter(s) serving the upstream input(s) and downstream output(s) of the RF amplifier. Example embodiments of the invention discussed herein show how HFC plant RF amplifiers with a high-split diplex filter can maintain the traditional leakage test signal at a frequency receivable by a legacy leakage test system, thereby enabling leakage testing of all coaxial cable in the HFC plant even beyond HFC plant amplifiers, while simultaneously extending the cable operator ability to provide a gigabit speed upstream service to HFC plant customers to non-fiber-deep N+X HFC plants.

Other embodiments of the invention discussed below involve the performance of an aeronautical leakage test using a leakage test signal that is propagated in an upstream direction. Thus, embodiments of the invention are discussed herein which propagate the leakage test signal in the downstream direction, while other embodiments are discussed herein which propagate the leakage test signal in the upstream direction.

Spectrum Splits

In the prior art, the HFC spectrum was split to non-overlapping upstream and downstream frequency ranges, typically separated by a guard band frequency region. This approach of the prior art precluded the downstream conveyance of some specific legacy downstream (DS) signals as the DS signals are rigidly restricted to one or more specific frequencies or a range of frequencies that are wholly enclosed in the upstream section of the split spectrum.

An example of how the HFC spectrum is split in the prior art is the DOCSIS 3.1 defined high-split, which defines the upstream frequency range at 5-204 MHz and defines the downstream frequency range at 258-1218 MHz. The DOCSIS 3.1 defined high-split spectrum precludes the ability to downstream transmit a leakage test signal in a frequency close to the 108-137 MHz aeronautical band.

Embodiments Involving an Optical Node or a Remote-PHY Node

Embodiments of the invention enable the downstream propagation of a leakage test signal in a high-split optical node (or Remote-PHY node) in a frequency inside the upstream portion of the spectrum. Advantageously, embodiments allow for a leakage test signal to be propagated at a frequency receivable by a traditional leakage detection system while supporting enhanced upstream peak data rates, such as those experienced in a high-split spectrum. While specific examples of how a spectrum may be split will be discussed below and herein for purposes of providing a concrete example, it should be understood to those in the art that the embodiments of the invention discussed herein are not limited to any particular split or division of the spectrum. Thus, embodiments of the invention may be used in the context of a low-split, mid-split, high-split, or any additional or further developed usage of the spectrum that may be developed.

Figure 5:
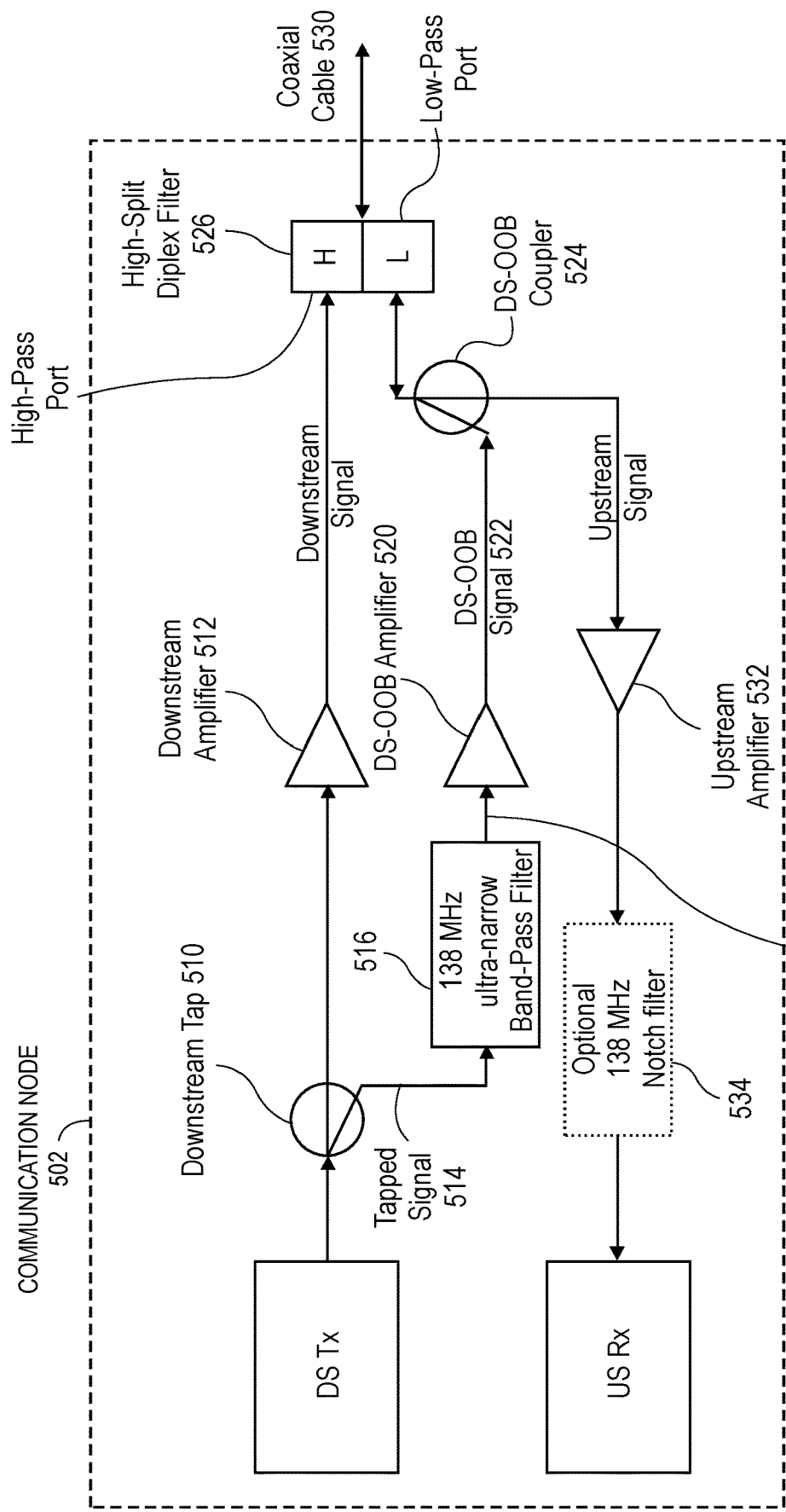
FIG. 5 is an illustration of a communication node supporting a high-split HFC plant as well as a leakage test signal centered at 138 MHz in accordance with an embodiment of the invention.

An embodiment of the invention enables downstream propagation of a dedicated leakage test signal in optical node or Remote-PHY node, in a frequency region defined for upstream transmission by the high-split diplex filter, as depicted in FIG. 5. Embodiments of the invention may be embodied as an optical node with high-split diplex filters that can support a traditional leakage test signal at a frequency receivable by a traditional leakage test system. When an optical node or a Remote-PHY node implementing an embodiment of the invention is used in a fiber deep N+0 HFC plant, the leakage test signal can propagate all the way to customers' homes, thereby enabling leakage testing of all the coaxial cable in the HFC plant. At the same time, the use of high-split diplex filter in the node enables the cable operator to provide a gigabit speed upstream service to customers.

FIG. 5 is an illustration of a communication node 502 supporting a high-split HFC plant as well as a leakage test signal at 138 MHz in accordance with an embodiment of the invention. The leakage test signal of an embodiment may be similar or even identical in nature to the leakage test signals used in prior art leakage test systems. The dedicated leakage test signal of an embodiment may use the same frequency as used in legacy systems (e.g., 138 MHz which is above and very close to the VHF aeronautical band), or a different frequency (e.g., 107 MHz which is below and very close to the VHF aeronautical band). Typically, a frequency outside the actual VHF aeronautical band is used to prevent the leakage test signal itself from interfering with the aeronautical band, but usage of a frequency close to the aeronautical band is desirable.

Communication node 502 may be a high-split optical node or a Remote-PHY node. The term "Remote-PHY node" is well-understood in the art and discussed in U.S. patent application Ser. No. 15/847,029, entitled 'Dynamically Adjusting DOCSIS Port Utilization,' filed on Dec. 17, 2017, the entire disclosure of which is hereby incorporated by reference for all purposes as if fully set forth herein. The term "optical node" is well-understood in the art and discussed in U.S. Pat. No. 10,505,499, entitled 'Power Saving by Configurable Adjustment of Power Amplifier,' filed on Apr. 2, 2019, the entire disclosure of which is hereby incorporated by reference for all purposes as if fully set forth herein. Optical nodes and Remote-PHY nodes are also discussed in U.S. Provisional Patent Application No. 62/893,625, entitled 'Aeronautical Band Leakage Test in High Split HFC Plant,' filed on Aug. 29, 2019, the entire disclosure of which is hereby incorporated by reference for all purposes as if fully set forth herein.

In FIG. 5, a portion of the downstream signal power is tapped by downstream tap 510 at the input to node 502 and before downstream amplifier 512 to create tapped signal 514. Tapped signal 514 contains the leakage test signal as well as all other downstream signals and channels. Tapped signal 514 is introduced to filter 516, which is designed to pass only a narrowband frequency window around the leakage test signal. Since the leakage test signal is typically very narrowband (e.g., several kHz), a resonance band pass filter or a narrow SAW filter can be used. Thus, filter 516 passes the leakage test signal as filtered signal 518 but attenuates all other RF signals carried by tapped signal 514, including all other downstream signals and channels. Filtered signal 518 is further amplified as needed by amplifier 520 to result in amplified leakage test signal 522.

Amplified leakage test signal 522 is coupled via coupler 524 into the low-pass port of high-split diplex filter 526. In the prior art, the low-pass port of a high-split diplex filter is normally used only for upstream signals, which traverse over the low-pass port of a high-split diplex filter from coaxial cable 530 to node 502. However, in an embodiment, amplified leakage test signal 522 propagates through high-split diplex filter 526 in the same path taken by the upstream signal but in the opposite direction, i.e., amplified leakage test signal 522 propagates onto coaxial cable 530 via the low-pass port of high-split diplex filter 526.

The leakage test signal is also being processed and amplified by downstream amplifier 512 by downstream RF processing chain of node 502, but that leakage test signal is introduced to the high-pass port of high-split diplex filter 526. This leakage test signal is blocked from passing through the high-pass port of high-split diplex filter 526 because high-split diplex filter 526 blocks signals at a frequency below the maximum upstream frequency (typically 204 MHz in a high split diplex filter). However, amplified leakage test signal 522, which is coupled to the low-pass port of high-split diplex filter 526, is in the pass-band of high-split diplex filter 526 and indeed is passed to the output of node 502 onto coaxial cable 530.

In an embodiment, while upstream amplifier 532 provides amplification in the upstream path, optional notch filter 534 (or band reject filter) as shown in FIG. 5 may be used to provide attenuation to a narrowband window around the frequency of the leakage test signal. This prevents leakage of the leakage test signal, or a signal echo, introduced by imperfect RF components and devices internal and external to node 502, from interfering with the reception of the upstream signal by stressing the dynamic range of various components processing the upstream signal (such as the upstream analog to digital converter). In a typical utilization of node 502, a similar small frequency window around the leakage test signal is excluded from being used by upstream signals to prevent interference between the leakage test signal and upstream transmissions.

Figure 6:
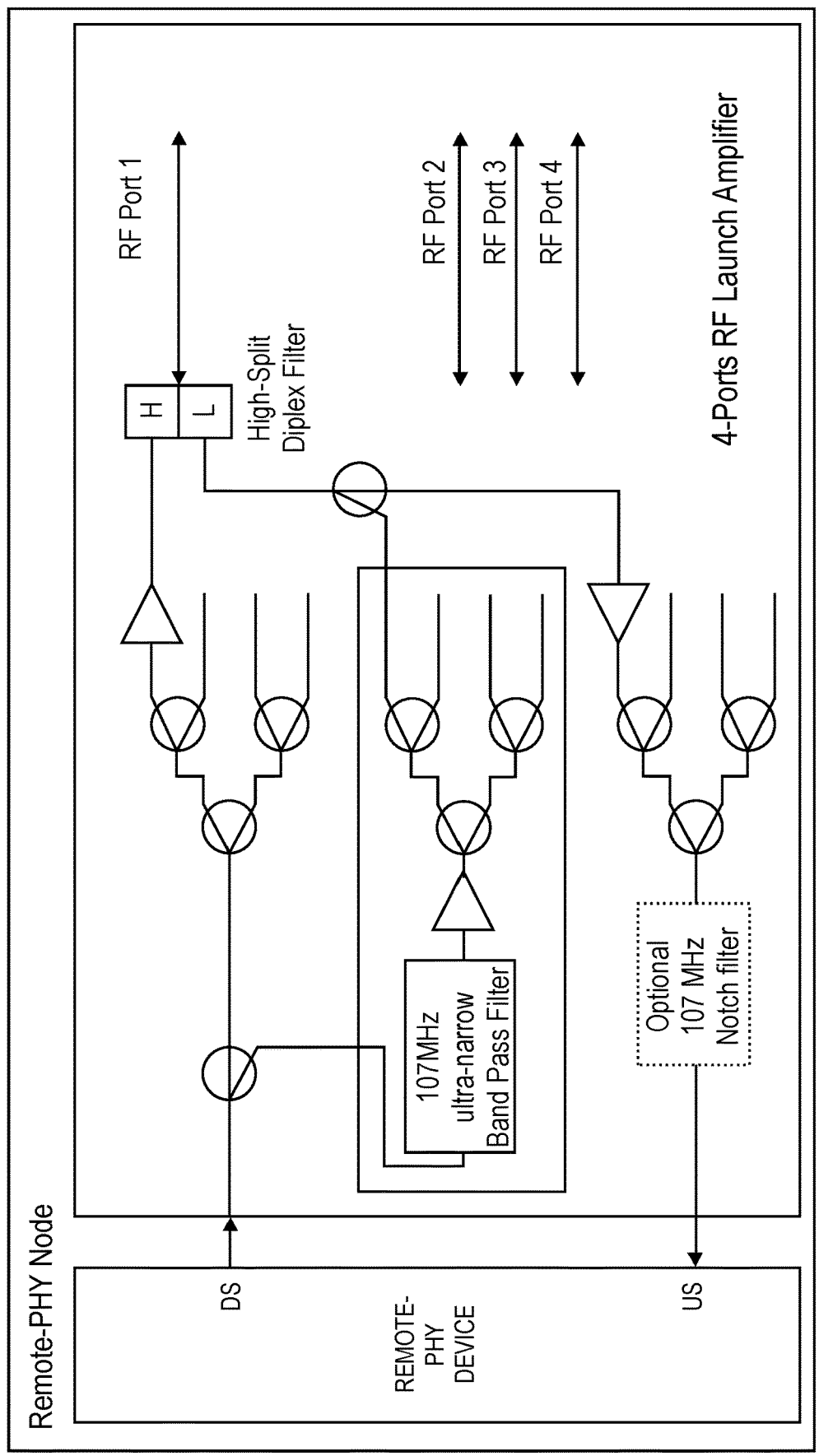
FIG. 6 is an illustration of a Remote-PHY node supporting a high-split HFC plant as well as a leakage test signal centered at 107 MHz across four RF ports (detail provided at Port 1) according to an embodiment of the invention.

Another embodiment of the invention, which extends the implementation to a node with a plurality of RF ports, is depicted by FIG. 6. FIG. 6 is an illustration of a Remote-PHY node supporting a high-split HFC plant as well as a leakage test signal at 107 MHz across four RF ports (detail provided at Port 1) according to an embodiment of the invention. In FIG. 6, the leakage test signal is split to multiple instances, and each is separately coupled to the low-pass ports of the high-split diplex filters handling each one of the node ports. Note that changing the center frequency of the band-pass filter and the optional notch filter to around 107 MHz will enable the use of a dedicated leakage test signal at frequencies below the VHF aeronautical band.

Figure 7:
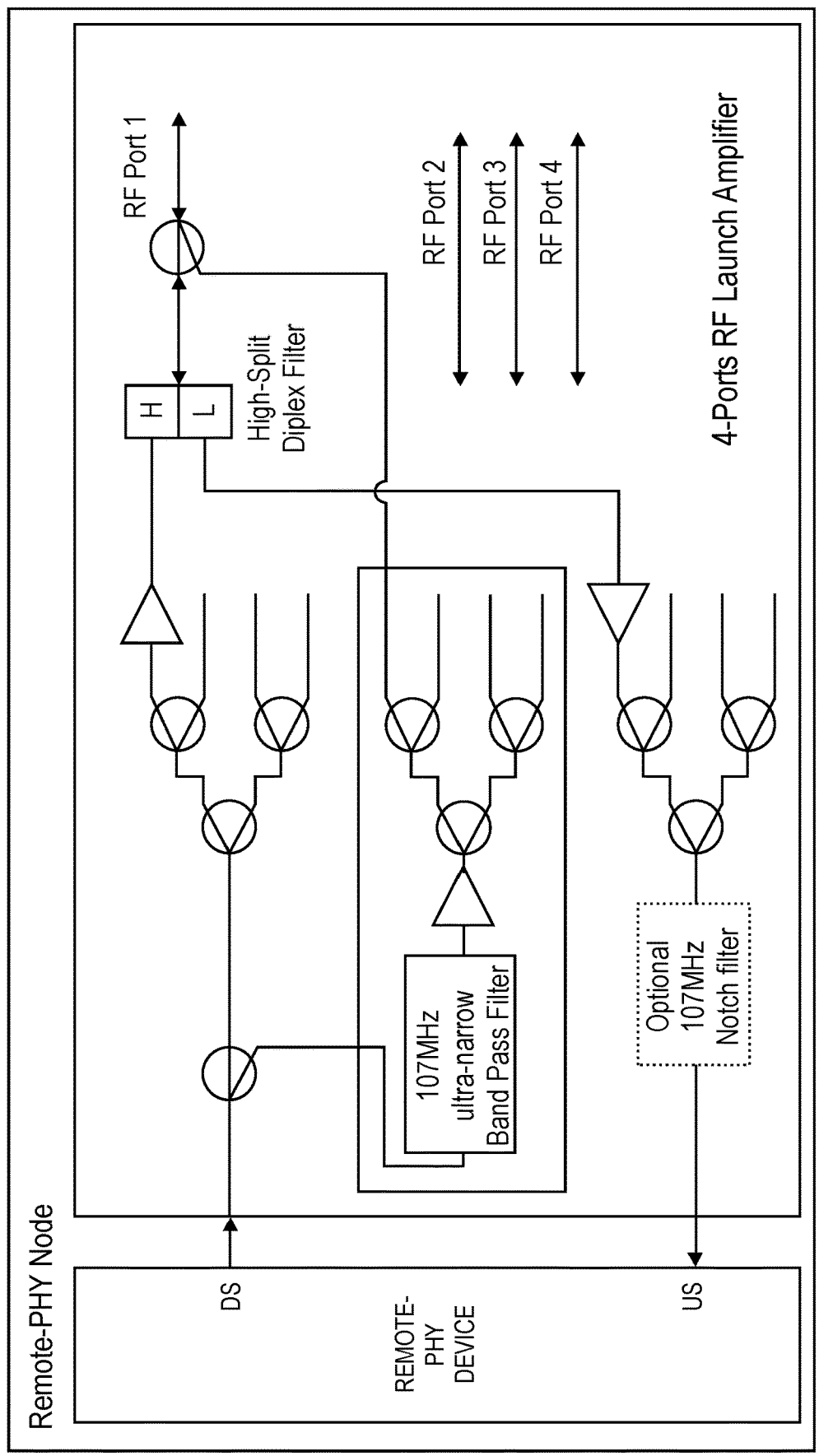
FIG. 7 is an illustration of a Remote-PHY node supporting a high-split HFC plant as well as a leakage test signal centered at 107 MHz across four RF ports and with an output coupler after the diplexer (detail provided for Port 1) according to an embodiment of the invention.

FIG. 7 is an illustration of a Remote-PHY node supporting a high-split HFC plant as well as a leakage test signal centered at 107 MHz across four RF ports and with an output coupler after the diplexer (detail provided for Port 1) according to an embodiment of the invention. In the embodiment depicted by FIG. 7, an RF directional coupler is used to combine the leakage test signal to each one of the node ports after the diplex filter. Note that this embodiment has the undesired effect of introducing an additional RF power loss in the DS signal path after the high-power amplifier.

Figure 8:
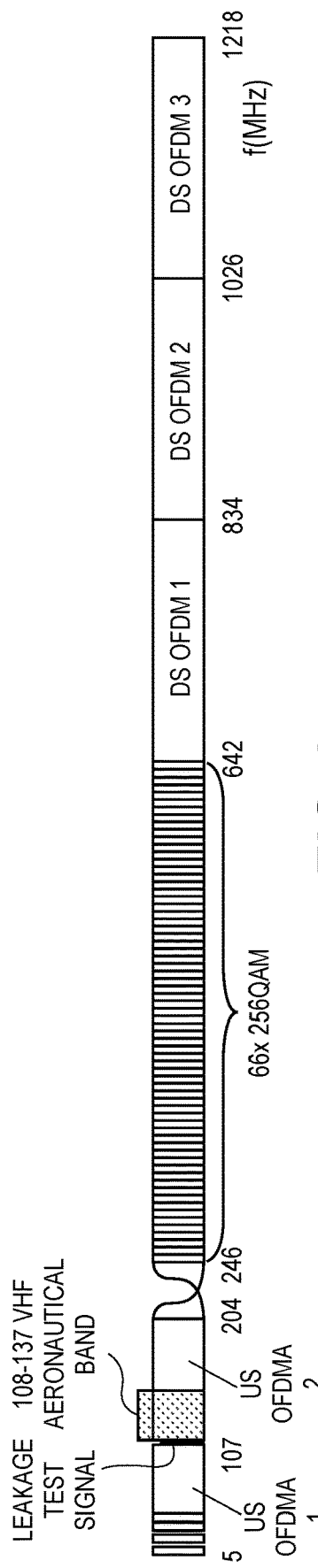
FIG. 8 is an illustration of a North American 1218 MHz high-split HFC plant spectrum utilizing an embodiment of the invention to support a leakage test signal at 107 MHz according to an embodiment of the invention.
Figure 9:
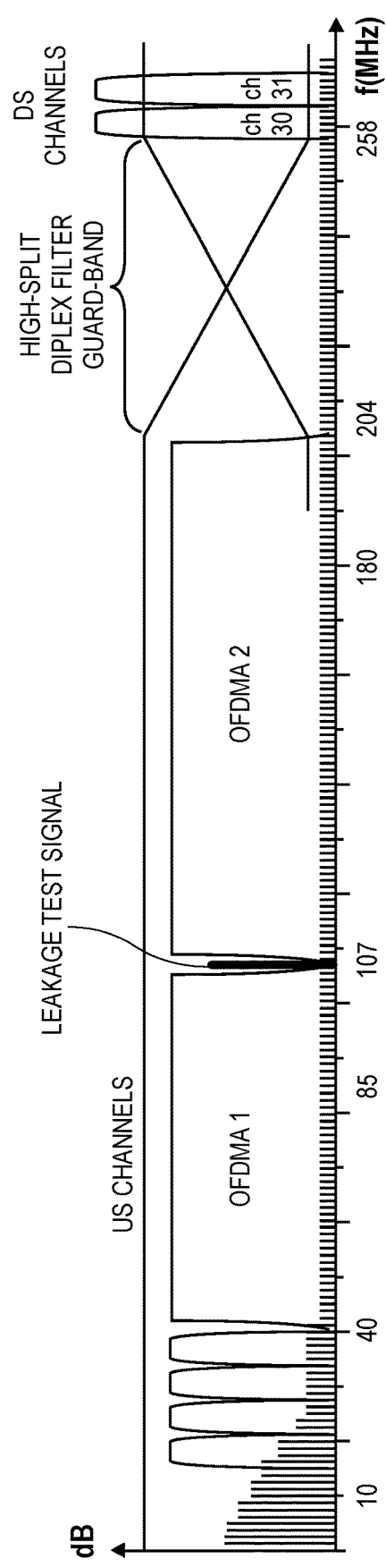
FIG. 9 is an illustration of an enhanced view of the lower frequency region of the spectrum shown in FIG. 8 according to an embodiment of the invention.

An example of an upstream channel arrangement used in conjunction with an embodiment of the invention when the leakage test signal is placed at 107 MHz is depicted by FIGS. 8 and 9. FIG. 8 is an illustration of a North American 1218 MHz high-split HFC plant spectrum utilizing an embodiment of the invention to support a leakage test signal at 107 MHz according to an embodiment of the invention. FIG. 9 is an illustration of an enhanced view of the lower frequency region of the spectrum shown in FIG. 8 according to an embodiment of the invention. Four DOCSIS 3.0 ATDMA upstream channels are typically placed in the frequency range between 15 to 42 MHz. One partial DOCSIS 3.1 OFDMA channel can be placed between 42 to 106 MHz. A second full DOCSIS 3.1 OFDMA channel can be placed between 108 to 204 MHz. The dedicated leakage test signal resides between the two upstream OFDMA channels as shown in the example of FIG. 9.

Figure 10:
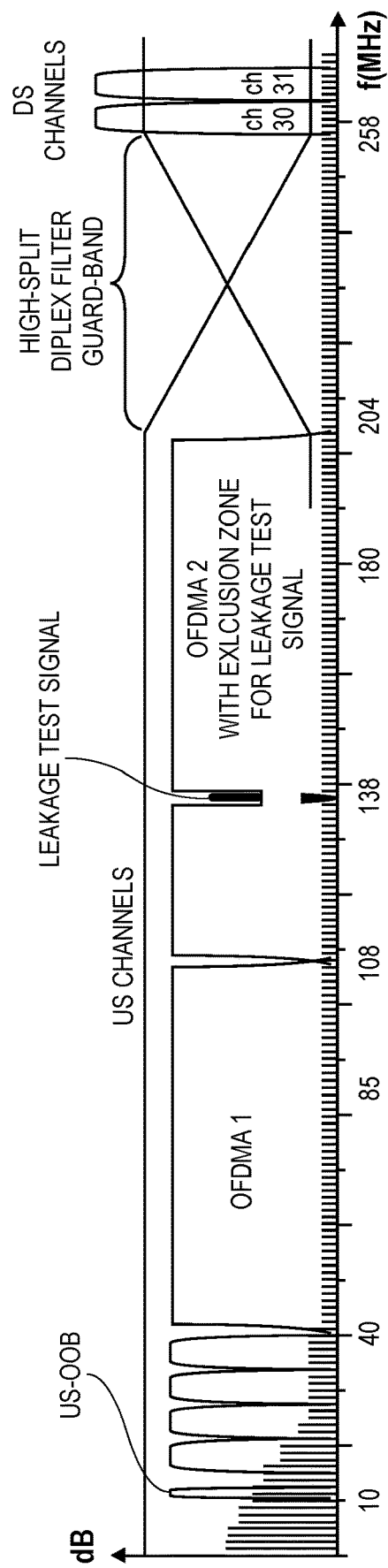
FIG. 10 is an illustration of an enhanced view off the lower frequency region of the spectrum shown by FIG. 8 that depicts an upstream channel arrangement in accordance with an embodiment of the invention.

FIG. 10 is an illustration of an enhanced view off the lower frequency region of the spectrum shown by FIG. 8 that depicts an upstream channel arrangement in accordance with an embodiment of the invention. Four DOCSIS 3.0 ATDMA upstream channels are typically placed in the frequency range between 15 to 42 MHz. One partial DOCSIS 3.1 OFDMA channel can be placed between 42 to 108 MHz. A second full DOCSIS 3.1 OFDMA channel can be placed between 108 to 204 MHz. The second channel is depicted as configured with an optional 2 MHz exclusion zone around 138 MHz to avoid interference with the leakage test signal at 138 MHz.

Embodiments Involving an HFC Plant RF Amplifier

Figure 11:
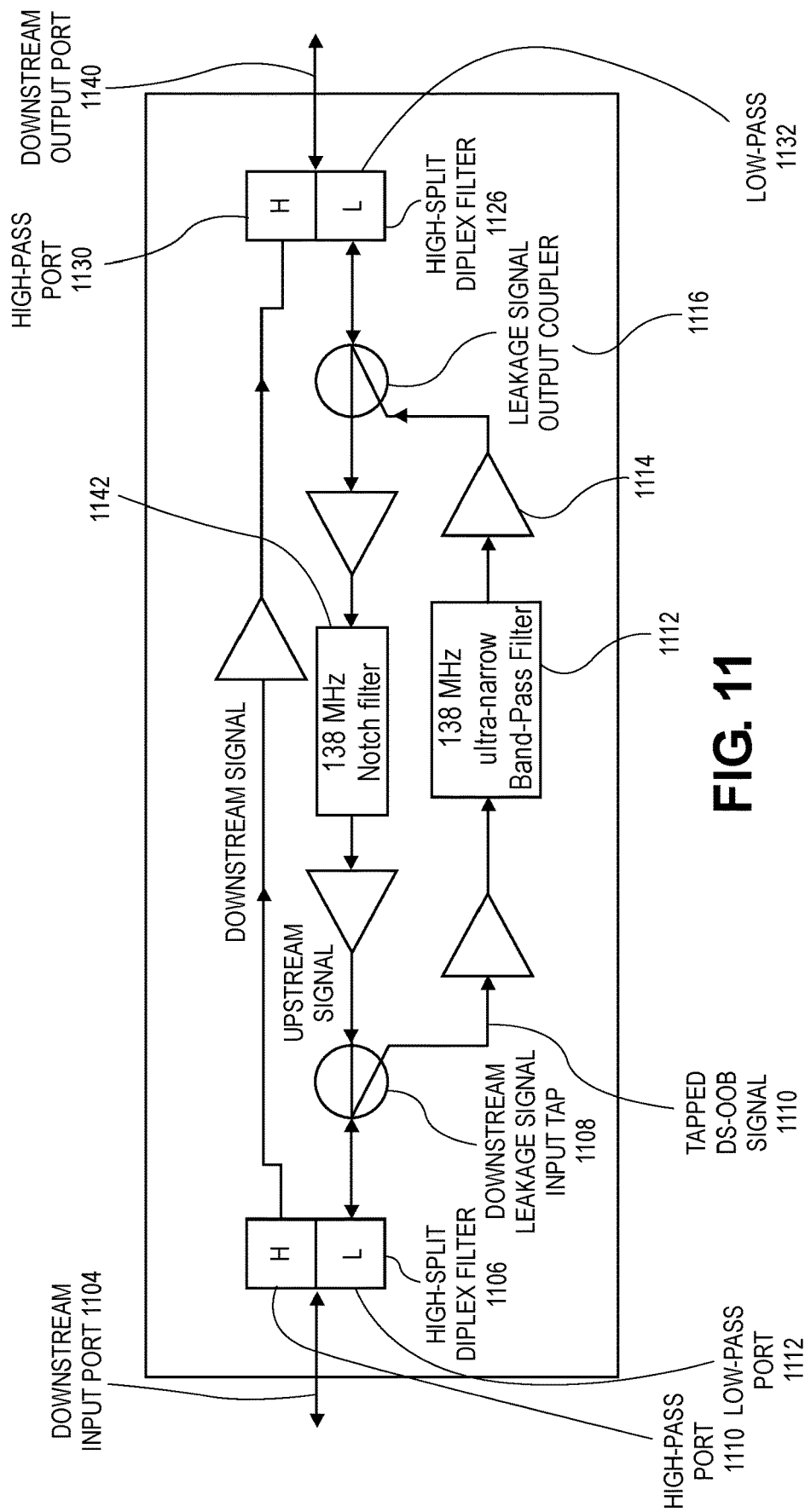
FIG. 11 is an illustration of an HFC plant RF amplifier supporting high-split as well as a leakage test signal at 138 MHz in accordance with an embedment.

An extension of the above embodiment of the invention further enables the downstream propagation of the leakage test signal in high-split HFC plant RF amplifiers, as depicted by the embodiment of the invention shown by FIG. 11. Advantageously, embodiments of the invention enable HFC plant RF amplifiers with a high-split diplex filter to maintain a traditional leakage test signal at a frequency receivable by a legacy leakage test systems, thereby enabling leakage testing of all coax in the HFC plant even beyond HFC plant amplifiers, while simultaneously extending to the cable operator the ability to provide a gigabit speed upstream service to HFC plant customers to non-fiber-deep N+X HFC plants.

FIG. 11 is an illustration of an HFC plant RF amplifier supporting high-split as well as a leakage test signal at 138 MHz in accordance with an embedment. As shown in FIG. 11, the leakage test signal enters the RF amplifier 1102 at the single downstream input port 1104, which also functions as the single upstream output port. The leakage test signal cannot follow the regular downstream signal to high-pass port 1110 of high-split diplex filter 1106. Instead, the leakage test signal is passed by high-split diplex filter 1106 to low-pass port 612.

After passing through low-pass port 1112, the leakage test signal is tapped by input tap 1108 to create tapped leakage test signal 1110. Tapped leakage test signal 1110 is introduced to band-pass filter 1112, which is designed to pass only a narrowband frequency window around the leakage test signal. Thus, band-pass filter 1112 passes the leakage test signal, but attenuates all other RF signals, including all other downstream and upstream signals and channels. The leakage test signal is amplified by amplifier 1114 as needed and then coupled via output coupler 1116 into low-pass port 1132 of high-split diplex filter 1126. High-split diplex filter 1126 serves the downstream output (and upstream input) port 1140 of RF amplifier 1102. The leakage test signal propagates through high-split diplex filter 1126 and high-split diplex filter 1106 in the same path taken by the upstream signal but in the opposite direction.

As shown in FIG. 11, notch filter 1142 (or band reject filter) is added to the upstream signal processing chain to provide attenuation in a narrowband window around the frequency of the leakage test signal. Notch filter 1142 typically has a slightly wider frequency rejection window than the pass window of band-pass filter 1112 in the dedicated leakage test path. Notch filter 1142 prevents undesired oscillations in RF amplifier 1102 due to an RF amplifier trait known as loop-gain. Proper design of notch filter 1142 will prevent oscillation from being created when RF leakage or echoes are introduced by imperfect RF components and devices internal and external to RF amplifier 1102.

Figure 12:
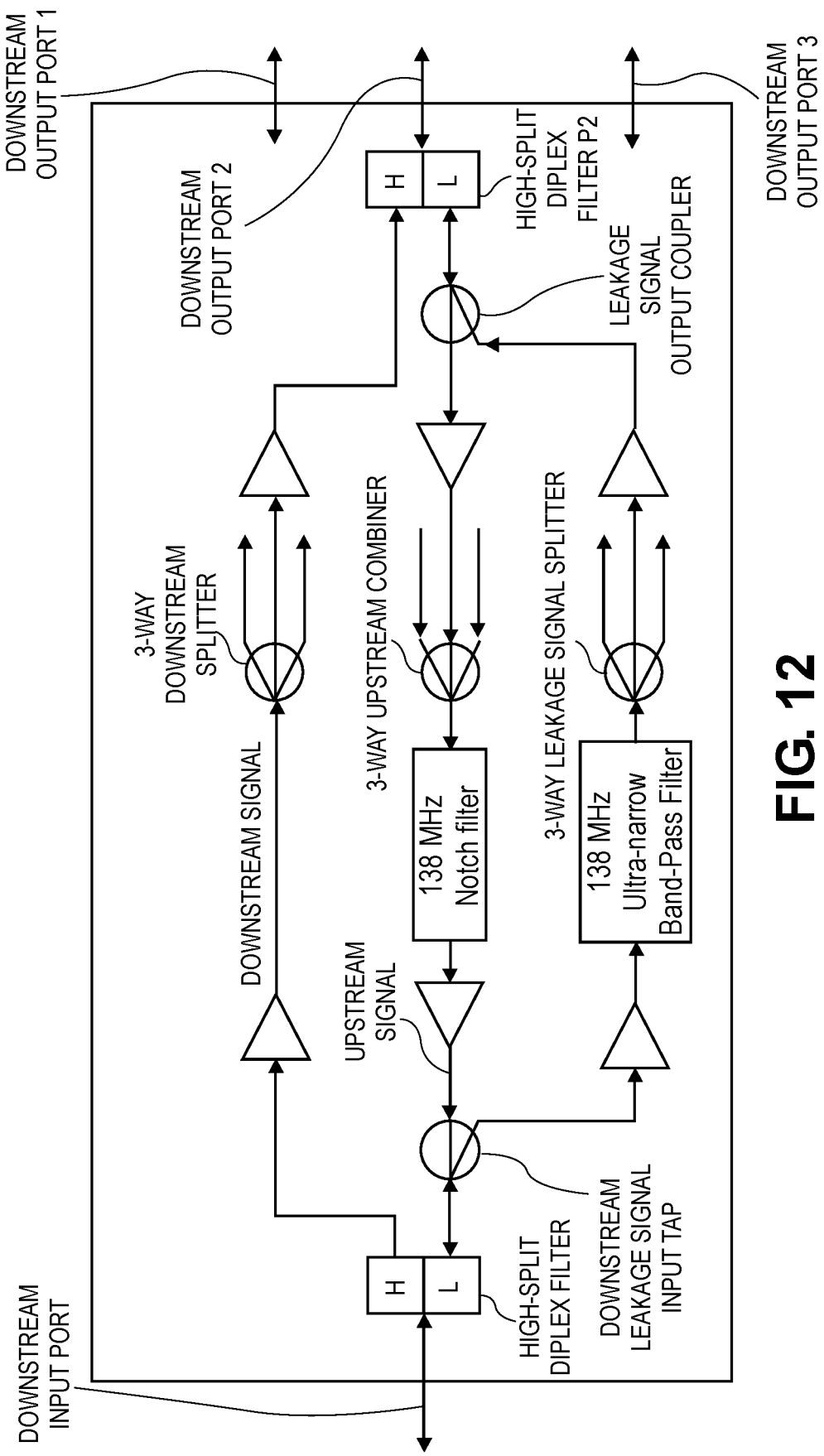
FIG. 12 is an illustration of an HFC plant RF amplifier with a plurality of downstream output ports is depicted in accordance with an embedment of the invention.

Another embodiment of the invention involving an HFC plant RF amplifier with a plurality of downstream output ports is depicted by the illustration of FIG. 12. The HFC plant RF amplifier shown in FIG. 12 supports high-split as well as propagation of a leakage test signal at 138 MHz across three downstream output ports (detail illustration provided only to Port 2). As shown by FIG. 12, the leakage test signal is split to multiple instances, each of which is coupled to the low-pass ports of the high-split diplex filters handling each one of the RF amplifier's downstream output (also upstream input) ports.

Figure 13:
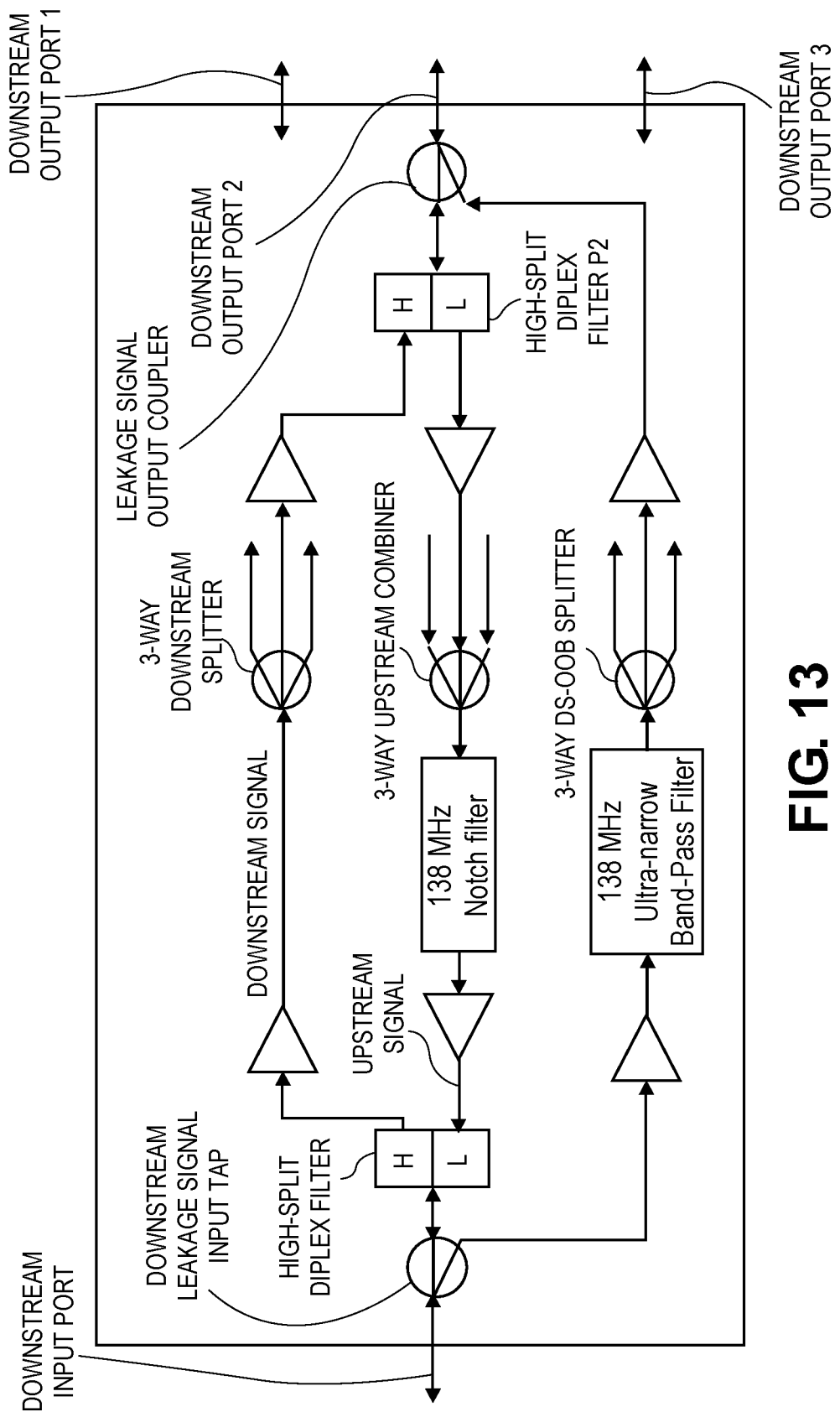
FIG. 13 is an illustration of a RF amplifier that supports a high-split HFC plant as well as a leakage test signal centered at 138 MHz across three RF ports and with input and output couplers "outside" the diplexers (detail provided for Port 2) according to an embodiment of the invention.

FIG. 13 is an illustration of a RF amplifier that supports a high-split HFC plant as well as a leakage test signal centered at 138 MHz across three RF ports and with input and output couplers "outside" the diplexers (detail provided for Port 2) according to an embodiment of the invention. In the embodiment depicted by FIG. 13, an RF directional coupler is used to combine the leakage test signal to each one of the node ports "outside" the diplex filters (connected in line with the RF near the common port of each diplex filter), instead of "inside" the diplex filter (connected in line with the RF near the low port of each diplex filter). Note that this embodiment has the undesired effect of introducing an additional RF power loss in the DS signal path before the first DS amplifier and after the high-power amplifier.

A hybrid embodiment of the invention may use one directional coupler "outside" the diplex filters (connected in line with the RF near the common port of an input or output diplex filter), and the other "inside" the diplex filter (connected in line with the RF near the low port of the opposing input or output diplex filter).

Leakage Detection Alternatives

A traditional leakage test system uses a dedicated downstream leakage test signal transmitted downstream throughout the cable plant, where leakage in a coaxial cable may be detected by a wireless receiver near the leaking coaxial cable. Embodiments of the invention have been discussed herein which propagate a leakage test signal in the downstream direction in a high-split cable system.

A different embodiment of the invention enables constructing an alternative leakage test system which can be used to fulfill the FCC leakage test requirements in a high-split cable system. Proposed here is an inverse leakage detection system, in which a wireless transmitter transmits a special leakage test signal. The special leakage test signal may be modulated to contain specific information such as an identification of the specific wireless transmitter transmitting the signal, the GPS coordinates of the wireless transmitter transmitting the signal, the time of transmission, and other such identifying information. This constitutes an in-band information transfer scheme to provide specific information to the leakage analysis system.

Figure 3A:
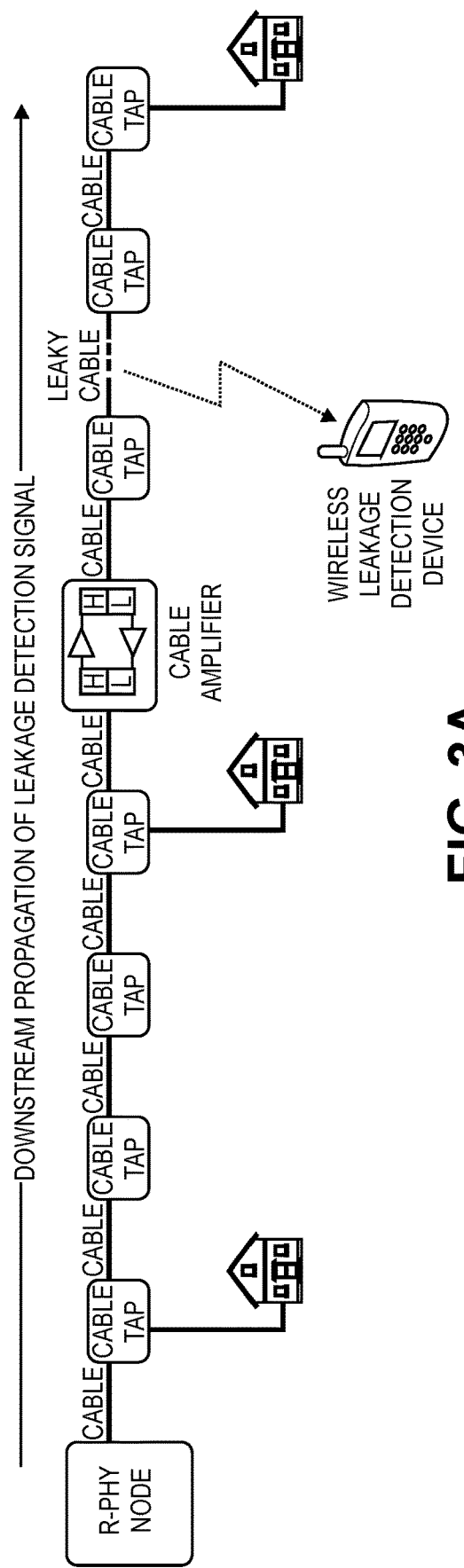
FIG. 3A depicts the downstream propagation of a leakage test signal as used in certain leakage test system known in the prior art.
Figure 3B:
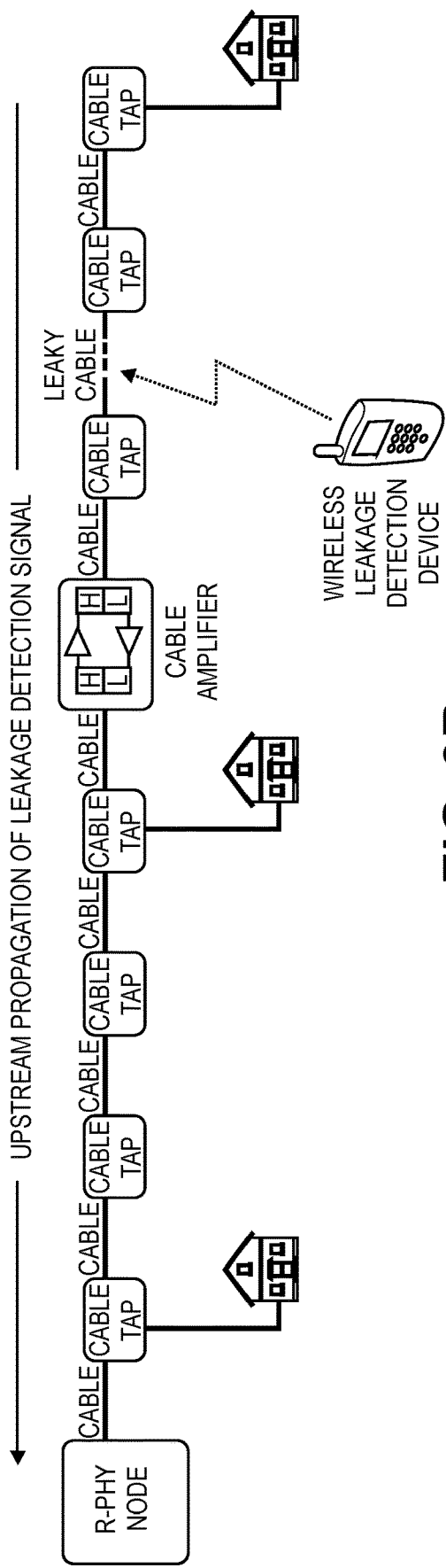
FIG. 3B is an illustration of the upstream propagation of a leakage test signal in accordance with an embodiment of the invention.
Figure 4:
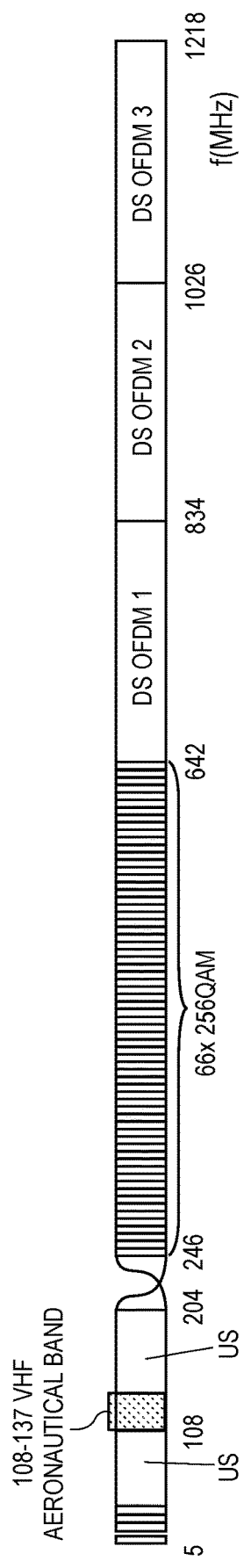
FIG. 4 is an illustration of a typical upgraded North American 1218 MHz high-split HFC plant spectrum as known in the prior art.

FIG. 3B is an illustration of leakage in an HFC cable plant detected by a wireless leakage detection device employed in an inverse leakage detection system of an embodiment. The HFC cable plant shown in FIG. 3B comprises an R-PHY node, RF plant amplifier, and cable taps to provide the cable signals to customers' homes. A leakage in the HFC cable plant will cause a pickup of the wirelessly transmitted signal by the cable. In a high-split HFC cable plant, a use of a special leakage test signal frequency near the VHF aeronautical band will enable the leakage signal pickup to propagate through the upstream ports of any diplex filter in the plant, traversing the cable plant all the way to the optical node or the R-PHY node. That node can receive the leakage signal pickup and either analyze the receive signal or convey the signal for analysis in a remote location (such as in the headend) through its fiber connection to the remote location. In the analysis of the leakage signal pickup, the information embedded in the signal can be used to identify the location in the HFC cable plant where leakage occurred. For example, the information embedded in the leakage signal may include the GPS coordinates of the location of the wireless transmitter transmitting the leakage signal, providing the approximate location of the leakage. Moreover, the closer that wireless transmitter is to the leakage location, the stronger the received signal will be, thereby providing means to discover the exact leakage location by bringing the wireless transmitter closer to the leakage location.

In an alternative embodiment, the leakage detection wireless transmitter can create a record of its GPS location at any given time. Records of the GPS location of the leakage detection wireless transmitter can be made available to the leakage analysis system to compare against the time when the leakage signal pickup was detected. This off-line information transfer scheme can also be used to identify the location in the HFC cable plant where leakage had occurred.

In yet another embodiment, the leakage detection wireless periodically conveys its GPS location to the leakage analysis system situated in a remote location by using any available data link (e.g., a cellular connection). This real-time out-of-band information transfer scheme may also be used to identify the location in the HFC cable plant where leakage had occurred.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A high-split node for propagation of a leakage test signal, comprising:
   first circuitry for, at an input of an amplifier of the high-split node, tapping a portion of the leakage test signal to create a tapped leakage test signal, wherein the tapped leakage test signal comprises both (a) the leakage test signal and (b) all other downstream signals and channels sent from a head-end to a set of customer premises equipment (CPE) via the high-split node;
   second circuitry for introducing the tapped leakage test signal to a band-pass filter that passes the leakage test signal and attenuates other radio frequency (RF) signals, including said all other downstream signals and channels, to create a filtered leakage test signal;
   third circuitry for amplifying the filtered leakage test signal to create an amplified leakage test signal; and
   fourth circuitry for coupling the amplified leakage test signal to a low-pass side of a diplex filter to propagate onto a transmission medium coupled to said set of customer premises equipment (CPE), wherein the amplified leakage test signal is propagated through the diplex filter in an opposite direction as an upstream signal propagated therethrough, and wherein said upstream signal is sent from one or more of said set of customer premises equipment (CPE) to said head-end.

2. The high-split node of claim 1, wherein said high-split node processes a downstream signal that is limited to a frequency range placed in an upstream range of a diplex filter.

3. The high-split node of claim 1, wherein said high-split node is a high-split optical node, a high-split Remote-PHY node, or a high-split Remote-MACPHY node.

4. The high-split node of claim 1, further comprising:
   a notch filter or a band reject filter for attenuating a portion of the leakage test signal that leaks into a signal path into an upstream receiver.

5. The high-split node of claim 1, further comprising:
   fifth circuitry for splitting the leakage test signal into multiple instances, wherein each separate instance of the leakage test signal is separately coupled to low-pass ports of high-split diplex filters handing each port of the high-split node.

6. A high-split RF amplifier for propagation of a downstream leakage test signal, comprising:
   first circuitry for, at a downstream input port of the high-split RF amplifier, coupling the leakage test signal to a high-split diplex filter that passes the leakage test signal;
   second circuitry for tapping a portion of the leakage test signal passed by the high-split diplex filter to create a tapped leakage test signal, wherein the tapped leakage test signal comprises both (a) the leakage test signal and (b) all other downstream signals and channels sent from a head-end to a set of customer premises equipment (CPE) via the high-split RF amplifier;
   third circuitry for introducing the tapped leakage test signal to a band-pass filter that passes the leakage test signal and attenuates all other radio frequency (RF) signals, including said all other downstream signals and channels, to create a filtered leakage test signal;
   fourth circuitry for amplifying the filtered leakage test signal to create an amplified leakage test signal; and
   fifth circuitry for coupling the amplified leakage test signal to a low-pass side of a diplex filter to propagate onto a transmission medium coupled to set of customer premises equipment (CPE),
   wherein said downstream input port of the high-split RF amplifier is the upstream output port, and
   wherein said upstream input port of the high-split RF amplifier is the downstream output port.

7. The high-split RF amplifier of claim 6, wherein said high-split RF amplifier processes a downstream signal that is limited to a frequency range placed in an upstream range of a diplex filter.

8. The high-split RF amplifier of claim 6, wherein said high-split node is a high-split optical node, a high-split Remote-PHY node, or a high-split Remote-MACPHY node.

9. The high-split RF amplifier of claim 6, further comprising:
   a notch filter or a band reject filter for attenuating a portion of the leakage test signal that leaks into a signal path designed to process and amplify the upstream signal.

10. The high-split RF amplifier of claim 6, further comprising:
    fifth circuitry for splitting the leakage test signal into multiple instances, wherein each separate instance of the leakage test signal is separately coupled to low-pass ports of high-split diplex filters handing each port of the high-split amplifier.

11. A method for propagating a leakage test signal, comprising:
    at an input of an amplifier of the high-split node, tapping a portion of the leakage test signal to create a tapped leakage test signal, wherein the tapped leakage test signal comprises both (a) the leakage test signal and (b) all other downstream signals and channels sent from a head-end to a set of customer premises equipment (CPE) via the high-split node;
    introducing the tapped leakage test signal to a band-pass filter that passes the leakage test signal and attenuates other radio frequency (RF) signals, including said all other downstream signals and channels, to create a filtered leakage test signal;
    amplifying the filtered leakage test signal to create an amplified leakage test signal; and
    coupling the amplified leakage test signal to a low-pass side of a diplex filter to propagate onto a transmission medium coupled to said set of customer premises equipment (CPE), wherein the amplified leakage test signal is propagated through the diplex filter in an opposite direction as an upstream signal propagated therethrough, and wherein said upstream signal is sent from one of said set of customer premises equipment (CPE) to said head-end.

12. The method of claim 11, wherein said high-split node processes a downstream signal that is limited to a frequency range placed in an upstream range of a diplex filter.

13. The method of claim 11, wherein said high-split node is a high-split optical node, a high-split Remote-PHY node, or a high-split Remote-MACPHY node.

14. The method of claim 11, further comprising:
    attenuating a portion of the leakage test signal that leaks into a signal path into an upstream receiver using a notch filter or a band reject filter.

15. The method of claim 11, further comprising:
    splitting the leakage test signal into multiple instances, wherein each separate instance of the leakage test signal is separately coupled to low-pass ports of high-split diplex filters handing each port of the high-split node.

* * * * *